(12) United States Patent
Smith

(10) Patent No.: US 6,771,440 B2
(45) Date of Patent: Aug. 3, 2004

(54) ADAPTIVE EVENT-BASED PREDICTIVE FAILURE ANALYSIS MEASUREMENTS IN A HARD DISK DRIVE

(75) Inventor: Gordon James Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 10/023,262

(22) Filed: Dec. 18, 2001

(65) Prior Publication Data

US 2003/0112538 A1 Jun. 19, 2003

(51) Int. Cl.[7] .......................... G11B 27/36; G06F 11/00
(52) U.S. Cl. ........................ 360/31; 360/75; 360/53; 360/25; 360/73.03; 714/42; 714/47; 714/48; 714/721; 714/723
(58) Field of Search ................ 360/31, 69, 75, 360/53, 25, 73.03; 714/42, 47, 48, 54, 721, 723

(56) References Cited

U.S. PATENT DOCUMENTS

| | | | | |
|---|---|---|---|---|
| 4,841,389 A | * | 6/1989 | Hoyt et al. | .................. 360/75 |
| 4,872,071 A | * | 10/1989 | Easton et al. | .................. 360/31 |
| 5,168,413 A | | 12/1992 | Coker et al. | |
| 5,410,439 A | * | 4/1995 | Egbert et al. | .................. 360/75 |
| 6,046,871 A | * | 4/2000 | Schaenzer et al. | ............. 360/31 |
| 6,401,214 B1 | * | 6/2002 | Li | ................................. 714/6 |
| 6,530,034 B1 | * | 3/2003 | Okada et al. | .................. 714/5 |
| 6,600,614 B2 | * | 7/2003 | Lenny et al. | .................. 360/31 |

\* cited by examiner

*Primary Examiner*—David Hudspeth
*Assistant Examiner*—Natalia Figueroa
(74) *Attorney, Agent, or Firm*—Dugan & Dugan

(57) ABSTRACT

In a first aspect, a method of operating a disk drive includes detecting a trigger event during non-idle operation of the disk drive, and responding to the detected trigger event by performing a predictive failure analysis with respect to the disk drive. According to a second aspect, a method of operating a disk drive includes performing a predictive failure analysis with respect to the disk drive at a regular time interval, detecting a trigger event during non-idle operation of the disk drive, and responding to the detected trigger event by reducing the regular time interval at which the predictive failure analysis is performed. Numerous other aspects are provided.

37 Claims, 3 Drawing Sheets

ADAPTIVE EVENT-BASED PREDICTIVE FAILURE ANALYSIS MEASUREMENTS IN A HARD DISK DRIVE

FIELD OF THE INVENTION

The present invention is concerned with computer systems, and is more particularly concerned with disk drives used for mass storage of data in computer systems.

BACKGROUND OF THE INVENTION

Disk drives are well known components of computer systems. Advances in disk drive technology have led to substantial increases in storage capacity, increased disk rotation speeds, and lower head flying heights. With these advances, there has been an increased need to detect conditions that may indicate that a head crash is imminent. Detection of such so-called "pre-crashed" conditions is referred to as "predictive failure analysis". Conventional predictive failure analysis involves measuring a number of operating parameters of the disk drive, including head flying height, hard error rates, soft error rates, vibration, and disk run out checks, and comparing such parameters with predetermined thresholds. According to known practices, predictive failure analysis is performed at regular time intervals, such as every four hours. It is also known, when a predictive failure analysis indicates a failure, to immediately perform the predictive failure analysis once again to confirm or reject the indication of failure. When a failure is indicated or confirmed by a predictive failure analysis, a warning may be issued to a host computer so that suitable preventive measures may be taken, such as transferring data from the disk drive and/or replacing the disk drive.

With the continuing advances in disk drive technology, the present inventor has recognized that it is desirable to provide for more stringent predictive failure analysis, while at the same time not unduly increasing the burden that predictive failure analysis imposes on disk drive operation.

SUMMARY OF THE INVENTION

According to a first aspect of the invention, a method of operating a disk drive includes detecting a trigger event during non-idle operation of the disk drive. Further according to this aspect of the invention, the method includes responding to the detected trigger event by performing a predictive failure analysis with respect to the disk drive. The predictive failure analysis may include, for example, one or more of flying height measurement, hard error rate measurement, soft error rate measurement, measurement of vibration, a disk run out check, a recording head measurement, and a servo system measurement.

According to a second aspect of the invention, a method of operating a disk drive includes performing a predictive failure analysis with respect to the disk drive at a regular time interval, detecting a trigger event during non-idle operation of the disk drive, and responding to the detected trigger event by reducing the regular time interval at which the predictive failure analysis is performed.

According to a third aspect of the invention, a method of operating a disk drive includes performing a predictive failure analysis with respect to the disk drive at a regular time interval, where the predictive failure analysis includes measuring an operating parameter of the disk drive and comparing the measured operating parameter against a first threshold and a second threshold. The method according to this aspect of the invention further includes reducing the regular time interval at which the predictive failure analysis is performed if the measured operating parameter exceeds the first threshold, and indicating a failure if the measured operating parameter exceeds the second threshold. The method may further include increasing the regular time interval at which the predictive failure analysis is performed if the measured operating parameter falls below a third threshold. The third threshold may be the same or different than the first threshold.

According to a fourth aspect of the invention, a method of operating a disk drive includes detecting a trigger event with respect to a particular data sector of the disk drive during non-idle operation of the disk drive, and in response to the detected trigger event, performing a flying height measurement with respect to the particular data sector. The method according to this aspect of the invention may further include relocating data from a cylinder that includes the particular data sector to another portion of the disk drive based on a result of the flying height measurement.

According to a fifth aspect of the invention, a method of operating a disk drive includes detecting a defect in a first cylinder of the disk drive, and in response to the detected defect, relocating to another portion of the disk drive data stored in a plurality of adjoining cylinders including the first cylinder.

According to further aspects of the invention, the inventive methods set forth above may be performed in a disk drive that includes at least one disk-shaped data storage medium, at least one head for reading data from and writing data to the storage medium, and a controller for controlling movement of the at least one head. Numerous other aspects are provided, as are computer program products. Each inventive computer program product may be carried by a medium readable by a computer (e.g., a carrier wave signal, a floppy disk, a hard drive, a random access memory, etc.).

Aspects of the invention may improve prediction of head crashes, without unduly increasing the overhead associated with predictive failure analysis. Other aspects of the invention may improve performance of a disk drive by moving data from portions of the disk medium which are defective and setting aside the defective portions.

Other objects, features and advantages of the present invention will become more fully apparent from the following detailed description of exemplary embodiments, the appended claims and the accompanying drawings.

DETAILED DESCRIPTION

The invention will now be described with reference to FIGS. 1–3.

Figure 1:
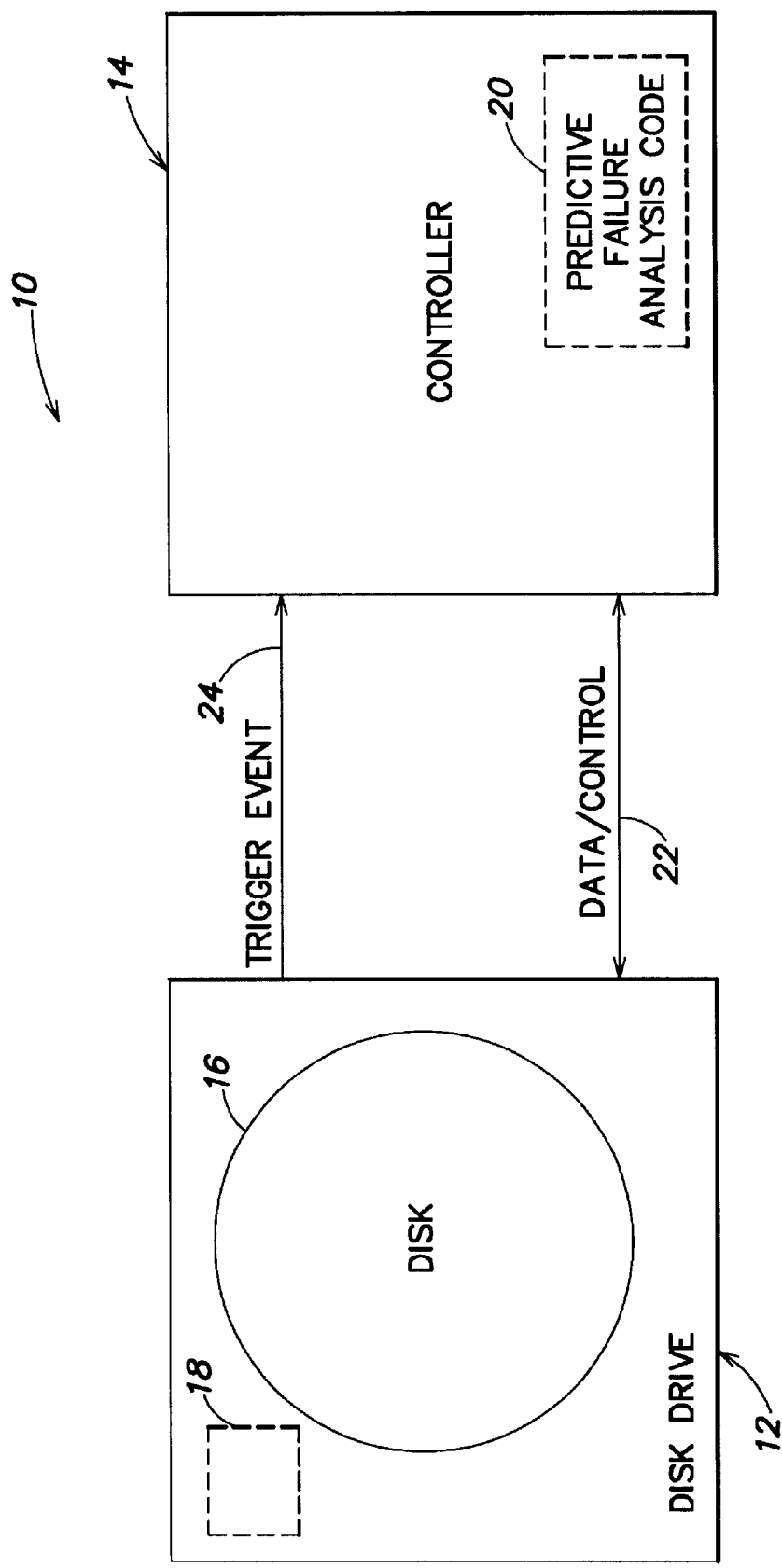
FIG. 1 is a schematic block diagram of a disk drive provided in accordance with the present invention.

FIG. 1 is a schematic block diagram of a disk drive 10 provided in accordance with the invention. As functionally illustrated in FIG. 1, the disk drive 10 includes disk drive hardware 12 and a controller 14 for controlling the disk drive hardware 12.

The disk drive hardware 12 includes one or more disks 16 on which data is magnetically recorded, and from which the data is read, by one or more heads, which are not separately shown. Optionally associated with the disk drive hardware 12 are one or more sensors 18, which may include a temperature sensor, a humidity sensor, an altimeter and/or an accelerometer.

Although the controller 14 is shown separately from the disk drive hardware 12, it will be appreciated that the controller 14 may be on board the disk drive hardware 12. Associated with the controller 14 is predictive failure analysis code 20 which programs the controller 14 to perform predictive failure analysis in accordance with aspects of the invention. The predictive failure analysis code 20 may, for example, be stored in a memory device such as an EEPROM or another similar storage device (not separately shown) associated with the controller 14.

The controller 14 is operationally coupled to the disk drive hardware 12 by first and second data paths 22 and 24. Data and control signals are exchanged between the controller 14 and the disk drive hardware 12 via the first data path 22, and signals indicative of trigger events (to be described below) are provided from the disk drive hardware 12 to the controller 14 via the second data path 24. Although the data paths 22 and 24 are shown as functionally separate, it should be understood that the two data paths 22 and 24 may be combined into a single data path.

The hardware aspects of the disk drive 10 may be entirely conventional, and may be constituted by a commercially available disk drive unit such as the IBM Ultrastar 73LZX, sold by the assignee of the present invention. The Ultrastar 73LZX features plural data storage disks rotating at 10,000 RPM and has a total storage capacity of approximately 73.4 gigabytes.

Figure 2:
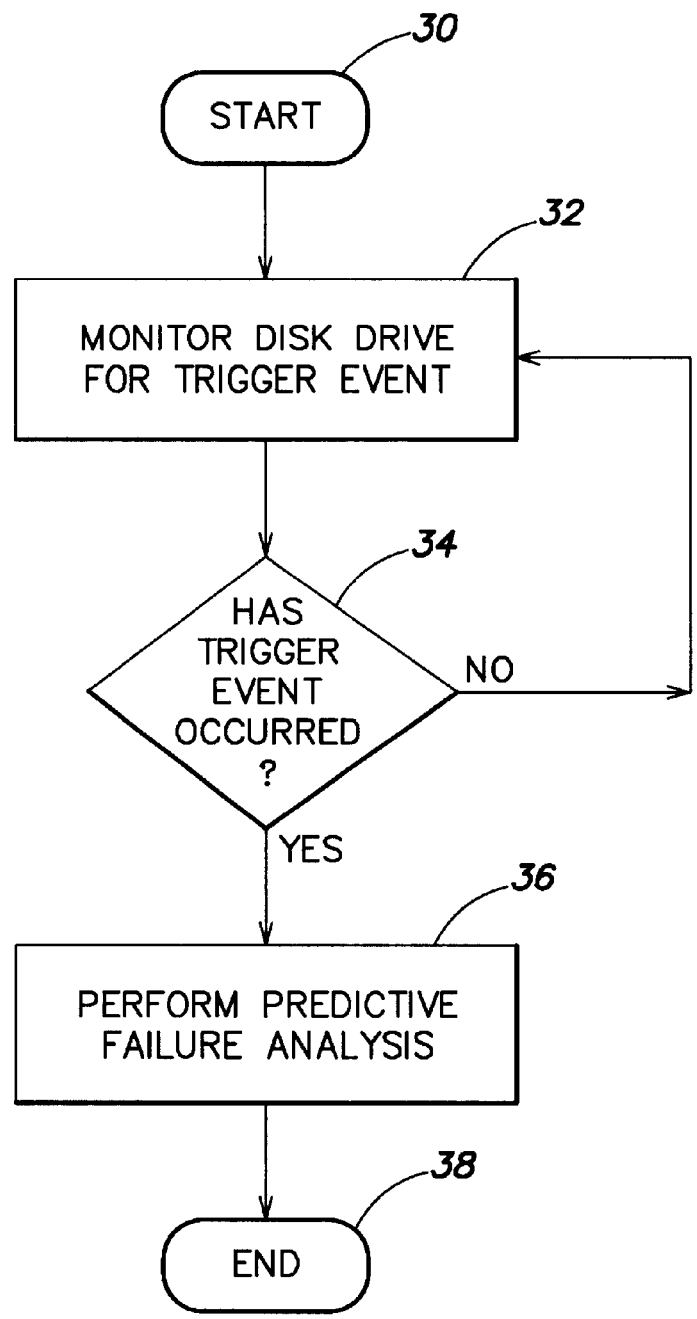
FIG. 2 is a flow chart that illustrates a process provided according to an aspect of the invention.

FIG. 2 is a flow chart that illustrates a process carried out by the controller 14 in accordance with an aspect of the invention. The process of FIG. 2 starts at block 30 and proceeds to block 32, at which the controller 14 monitors the disk drive hardware 12 for a trigger event. Trigger events may be indicative of situations that the present inventor has recognized as possibly leading to a head crash. Examples of trigger events will be described below. Following block 32 is a decision block 34 at which the controller 14 determines whether a trigger event has occurred. If a negative determination is made at block 34, then the process of FIG. 2 loops back to block 32 (to continue monitoring the disk drive for a trigger event). However, if a positive determination is made at block 34, then block 36 follows block 34. At block 36 a predictive failure analysis is performed. The process then ends at block 38.

To summarize the process of FIG. 2, a trigger event is detected, and, in response to the detected trigger event, a predictive failure analysis is performed with respect to the disk drive hardware 12. Thus the performance of a predictive failure analysis in accordance with this aspect of the invention is event-based, rather than being performed at pre-set time intervals.

Examples of suitable trigger events for triggering a predictive failure analysis includes the following:

(a) an increase in a media error rate;
(b) an increase in a servo error rate;
(c) a load/unload event;
(d) a start-stop event;
(e) a temperature that is outside of a predetermined temperature range;
(f) a humidity that is outside of a predetermined humidity range;
(g) a change in altitude;
(h) a predetermined period of inactivity;
(i) an acceleration that is in excess of a predetermined acceleration limit;
(j) a change in the disk run out; and
(k) a change in head parametrics.

The term "media error" is familiar to those who are skilled in the art, and refers to situations which arise when a data sector on a disk surface is either unreadable, or is only readable by resorting to one or more recovery procedures. A sudden increase in media errors, particularly where the errors relate to different parts of a disk surface, may be indicative of head-to-disk contact that can alter flying height and cause a head to crash.

The term "servo error" is also familiar to those who are skilled in the art, and refers to situations in which alignment of a head (e.g., using an actuator servo system) with a recording track is either impossible or is delayed. By way of example, major actuator servo errors, even when subsequent recovery occurs, may be indicative of conditions that will soon result in disk drive failure.

Load/unload events occur in the type of disk drive in which a ramp is provided for loading and unloading a head from a disk; and load/unload events refer to operations in which a head is loaded onto a disk from a ramp, or is unloaded from the disk onto the ramp. Load/unload events may cause a change in head flying height and hence may lead to disk drive failure.

A start/stop event may occur in certain types of disk drives for which the heads in the disk drives land on disk surfaces, and represents a situation in which relative motion between a head and disk begins or ends. This may occur, for example, when power is removed from or applied to a disk drive.

A temperature-based trigger event may occur when an operating temperature of a disk drive is outside of a nominal temperature range and in particular may occur when the temperature is outside of the nominal temperature range for more than a predetermined period of time. For example, a trigger event could be recognized when the operating temperature of a disk drive is 60° C. or more for one hour or more. In such a situation there may be mechanical deformation of the head, leading to a reduced flying height. Also, there tends to be more rapid spin-off of disk lubricant at higher temperatures, as the lubricant becomes less viscous. Other operating temperatures and/or time periods may be employed as trigger events.

Similarly, a humidity-based trigger event could be recognized when the operating humidity of a disk drive is outside of a nominal humidity range, or is outside of the nominal humidity range for more than a predetermined period of time. For example, a humidity-based trigger event could be recognized when the operating relative humidity of a disk drive is 80% or more for one hour or more. Other operating humidities and/or time periods may be employed as trigger events.

A trigger event relating to a change in head parametrics may be detected by analyzing the read signal voltage from a head to determine signal noise (e.g., by using the mean-squared error and/or signal asymmetry relative to the signal baseline).

A trigger event relating to a change in altitude may be detected after a disk drive is moved from one location to another, and may be indicated by a change in the flying height of all of the heads of a disk drive. Head flying height tends to be lower at higher altitudes, which may lead to disk drive failure. For example, an altitude-based trigger event could be recognized when that altitude of a disk drive is 8,000 feet or more. Other altitudes may be used as trigger events.

A trigger event related to a period of inactivity may be recognized when it is determined that the disk drive has been inactive for more than a predetermined period of time. For example, an inactivity-based trigger event could be recognized when a disk drive is inactive for more than one month. Other time periods may be employed as trigger events.

A trigger event related to acceleration may be recognized when it is determined, based on data provided by an accelerometer, that a disk drive has experienced rough or unusual handling of some kind. Accordingly, the triggering event may be recognized when accelerometer data indicates that the disk drive has experienced an acceleration in excess of a predetermined acceleration limit. For example, an acceleration-based trigger event could be recognized when a disk drive is accelerated by 2 G's or more. Other accelerations may be used as trigger events.

A trigger event related to disk run out may be recognized when after performing a disk run out check, the disk run out has increased by more than a predetermined amount. For example, a disk run out based trigger event could be recognized when a disk run out has increased by more than 20% in magnitude at the fundamental spindle frequency. Other disk run out increases may be used as trigger events.

The predictive failure analysis performed at block 36 of FIG. 2 may include one or more of any type of measurement conventionally included in a predictive failure analysis. For example, the predictive failure analysis may include one or more of flying height measurement, hard error rate measurement, soft error rate measurement, vibration measurement, a disk run out check, a recording head measurement and a servo system measurement. All of the foregoing measurements are known in the art and need not be further described, except to note that a "hard" error is considered to be a read error from which recovery is not possible, whereas a "soft" error is a read error from which recovery is possible. As is understood by those who are skilled in the art, absolute flying height need not be measured; rather, changes in flying height may be inferred from changes in read signal strength from the disk.

The procedure illustrated in FIG. 2 may be carried out together with, or in lieu of, the conventional process of performing predictive failure analysis at predetermined regular time intervals. If predictive failure analysis at regular intervals is not employed, then some of the overhead associated with the measurements and calculations associated with predictive failure analysis may be reduced, and disk drive performance may be improved. Also, by triggering predictive failure analysis in response to suitable events, it may be less likely that potential failures will go undetected. In at least one embodiment of the invention, events which occur during non-idle operation of the disk drive 10 are employed as trigger events. As used herein, "during non-idle operation" of a disk drive means during a read/write or seek/settle operation, during a data/error recovery operation associated with a read/write or seek/settle operation or the like; and does not include conventional predictive failure analysis performed during idle operation of a disk drive. Exemplary trigger events which occur during non-idle operation of a disk drive include an increase in a media error rate, an increase in a servo error rate, a load/unload event, a start/stop event, a temperature that is outside of a predetermined temperature range, a humidity that is outside of a predetermined humidity range, a change in altitude, etc.

According to a variation on the procedure of FIG. 2, a trigger event, instead of immediately triggering performance of a predictive failure analysis, may trigger a reduction in the regular time interval at which predictive failure analysis is performed. This aspect of the invention is advantageous in that it incurs the greater overhead of more frequent predictive failure analysis only when such more frequent analysis is likely to be needed, as indicated by the detected trigger event.

As still another variation on the procedure described above in connection with FIG. 2, one or more measurements included in a predictive failure analysis may be made with respect to two or more thresholds. For example, an operating parameter such as a change in flying height may be measured, and the change in flying height may be compared with a first threshold and a second threshold, where the second threshold is higher than the first threshold. If the second threshold is exceeded, then a disk failure may be declared. If only the first threshold is exceeded, then the exceeding of that threshold may be taken as a trigger event which triggers more frequent performance of a predictive failure analysis (i.e., a reduction in a regular time interval at which the predictive failure analysis is performed). For example, the first threshold may be some large fraction such as 80% of the second threshold, and the interval for performing predictive failure analysis could be reduced from 4 hours to 2 hours upon detecting that the first threshold is exceeded (or upon detecting that a predetermined number of consecutive or a certain percentage of measured operating parameters exceed the first threshold). Thereafter, if the first threshold is not exceeded for a certain number (or percentage) of measurements, then the interval for performing predictive failure analysis could be increased back to 4 hours. Other numbers of thresholds and/or threshold relationships may be employed. For example, if a measured operating parameter falls below a third threshold (or if a predetermined number of consecutive or a certain percentage of measured operating parameters fall below the third threshold), then the interval for performing predictive failure analysis could be increased (e.g., from 4 hours to 8 hours). The third threshold may be the same as or different than the first threshold.

The various aspects of the invention described above may be implemented in numerous scenarios. For example, a timer (not shown) used to control the regular time interval at which predictive failure analysis is performed may be reset/preset when a load/unload event occurs (e.g., to allow for immediate or more timely detection of a change in head flying height via predictive failure analysis after a load head command is executed). Likewise, for a disk drive operating at a base casting temperature of less than about 55° C., the regular time interval for performing predictive failure analysis may be about four hours. However, if the drive temperature increases to between about 55° C. and 60° C., the regular time interval may be reduced to about two hours; or to about one hour if the temperature exceeds 60° C.; or back to about four hours if the temperature returns to below 55° C. Other temperatures and/or ranges may be employed.

As another example, if the growth rate of spatially distinct media errors (e.g., media errors from non-repeating physical sector locations of a disk drive) exceeds a threshold (e.g., a predetermined number of media errors after a predetermined number of read operations), the regular time interval for performing predictive failure analysis may be reduced (or an immediate predictive failure analysis may be initiated). The regular time interval may be increased if after performing predictive failure analysis a predetermined number of times, there is no further indication of an impending disk drive failure (e.g., if there is no change in flying height or some other measured parameter). Similar operations may be performed based on servo errors or any other trigger event.

Figure 3:
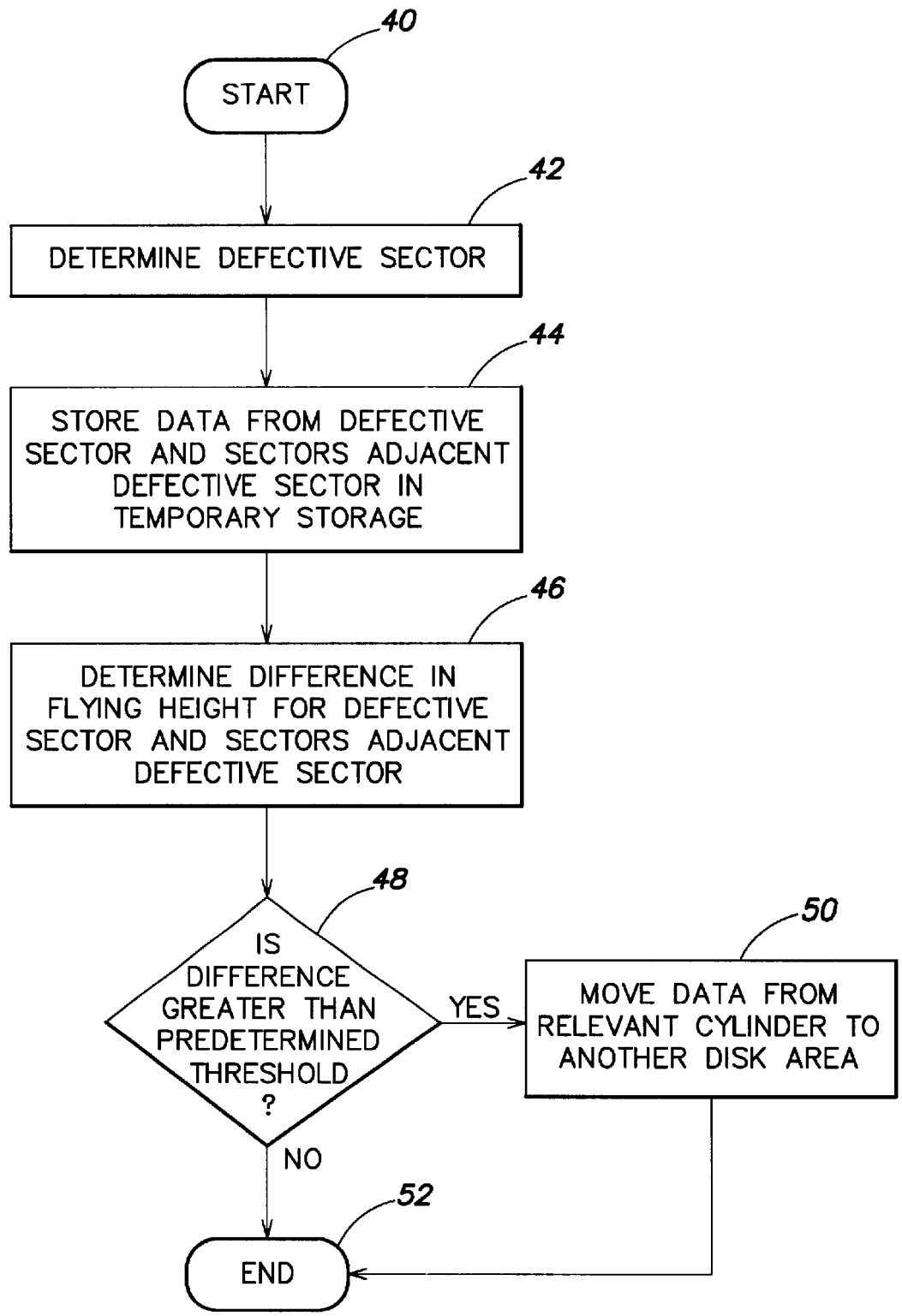
FIG. 3 is a flow chart that illustrates a process provided according to another aspect of the invention.

FIG. 3 is a flow chart that illustrates a process carried out by the controller 14 in accordance with another aspect of the invention. The process of FIG. 3 begins at block 40 and proceeds to block 42, at which a defective data sector of the disk drive 10 is determined (e.g., is located).

Following block 42 is block 44, at which data from the defective data sector and possibly from one or more adjacent data sectors is temporarily stored. The temporary storage may be in, for example, a random access memory or some other storage device (not separately shown) associated with the controller 14.

Following block 44 is block 46, at which the controller 14 determines a difference in flying height, if any, between the defective data sector and one or more data sectors adjacent the defective data sector. (As noted above, rather than measuring absolute flying height, relative flying height may be measured based on changes in read signal strength.) Then, at decision block 48, it is determined whether the difference, if any, between the flying heights for the defective data sector and the one or more adjacent data sectors is greater than a predetermined threshold. It will be appreciated that steps 46 and 48 encompass comparing the respective flying heights for the defective data sector and the adjacent data sectors and that adjacent data sectors may include sectors that are not directly adjacent the defective data sector (as described below).

If a positive determination is made at block 48, i.e., if the difference in flying height is greater than the predetermined threshold, then block 50 follows decision block 48. At block 50, the data from the cylinder which includes the defective data sector is moved to another area of the disk drive 10. (As is well known to those who are skilled in the art, "cylinder" refers to a plurality of vertically aligned data tracks, carried by respective disks in a disk drive that includes plural data storage disks.) Following block 50, the process of FIG. 3 ends (block 52).

Considering again decision block 48, if it is determined at that block that the difference in the respective flying heights for the defective data sector and the one or more adjacent data sectors is not greater than the predetermined threshold, then the process of FIG. 3 ends (block 52) following decision block 48.

The determination of the defective data sector at block 42 may include (e.g., may be in response to) detecting a triggering event with respect to a particular data sector of the disk drive 10. The detected trigger event may be, for example, one or more of the following: (a) a thermal asperity; (b) a write inhibit; (c) a read error; and (d) a local servo error with regard to the particular data sector. Other trigger events also may be employed.

A thermal asperity, as is known to those who are skilled in the art, is an increase in head temperature due to contact with a disk surface. As is also known, detection of a thermal asperity may occur by monitoring a read channel to detect a significant excursion in a read signal voltage base line.

As is also known, a "write inhibit" (also sometimes referred to as a "write skip") occurs when a writing operation is delayed by one or more revolutions of a disk because of a delay in a head settling at the desired recording track. The meanings of the terms "read error" and "servo error" have previously been discussed and are, in any event, familiar to those who are skilled in the art.

In one embodiment of the invention, flying height measurements are performed with respect to the apparent defective data sector and with respect to two data sectors located immediately before and two data sectors located immediately after the apparently defective data sector. For some disk drives, it is believed that at least the two data sectors before and the two data sectors after the defective data sector must be measured to obtain a meaningful baseline flying height measurement. Alternatively the number of adjacent data sectors used to obtain a baseline may be greater than two on each side of the defective data sector, or only one data sector on each side of the defective data sector. As another alternative, an adjacent data sector or adjacent data sectors on only one side of the defective data sector may be used to determine a baseline flying height value. It is also contemplated to measure the flying height of both the apparently defective data sector and the one or more adjacent data sectors a plurality of times, and then to average the resulting measurements. For example, the flying height of the defective data sector and the flying heights for the one or more adjacent data sectors may be measured ten times, the ten measurements for the apparently defective data sector may be averaged, all of the ten measurements for each adjacent data sector may be averaged, and the two averaged measurements may be compared with each other. Other averaging techniques may be used.

The predetermined flying height difference threshold used in decision block 48 may be established based on product tests carried out during development of the disk drive 10, or based on some other relevant criteria.

According to a further feature that may be provided in accordance with the aspect of the invention illustrated in FIG. 3, tracks that are adjacent to the track having the defective data sector may be checked for flying height changes, and, if necessary, the data in the cylinder or cylinders corresponding to the adjacent tracks may be moved.

According to still another aspect of the invention, if the difference in flying height between the apparently defective data sector and the one or more adjacent data sectors in a track is sufficiently great, then the data in adjacent cylinders may automatically be moved, along with the data in the cylinder corresponding to the defective data sector, to other portions of the disk drive 10.

The aspect of the invention illustrated in FIG. 3 may be advantageous in that, by eliminating accessing of a cylinder that includes a data sector wherein the flying height is excessively low, the possibility of a head crash may be reduced. Moreover, by eliminating reading such a data sector, in which read operations may be performed only with difficulty, the operating efficiency of a disk drive may be enhanced.

The processes of FIGS. 2–3, as well as the other processes described herein, may be implemented in hardware, software or a combination thereof. In at least one embodiment of the invention, the processes of the present invention are implemented in software, and comprise one or more computer program products.

The foregoing description discloses only exemplary embodiments of the invention; modifications of the above disclosed apparatus and method which fall within the scope of the invention will be readily apparent to those of ordinary skill in the art. For example, it is contemplated to apply the present invention in disk drives having only one data storage disk, or having any other number of data storage disks. It is also contemplated to apply the invention to disk drives in which there is only one head per disk, or in which there are plural heads per disk.

Furthermore, it is contemplated to use all aspects of the invention described above in a single disk drive, or to include only one of the aspects of the invention described above, or to include any combination of the aspects of the invention.

Accordingly, while the present invention has been disclosed in connection with exemplary embodiments, it should be understood that other embodiments may fall within the spirit and scope of the invention, as defined by the following claims.

The invention claimed is:

1. A method of operating a disk drive, comprising:
   detecting a trigger event during non-idle operation of the disk drive; and
   responding to the detected trigger event by adjusting a frequency of performing a predictive failure analysis with respect to the disk drive.

2. A method of operating a disk drive, comprising:
   performing a predictive failure analysis with respect to the disk drive at a regular time interval;
   detecting a trigger event during non-idle operation of the disk drive; and
   responding to the detected trigger event by reducing the regular time interval at which the predictive failure analysis is performed.

3. The method of claim 2, wherein the regular time interval is four hours before being reduced and is two hours after being reduced.

4. A method of operating a disk drive, comprising:
   performing a predictive failure analysis with respect to the disk drive at a regular time interval, the predictive failure analysis including measuring an operating parameter of the disk drive and comparing the measured operating parameter against a first threshold and a second threshold;
   reducing the regular time interval at which the predictive failure analysis is performed if the measured operating parameter exceeds the first threshold; and
   indicating a failure if the measured operating parameter exceeds the second threshold.

5. The method of claim 4, wherein the measured operating parameter is a change in flying height.

6. The method of claim 5, wherein the first threshold is 80% of the second threshold.

7. A method of claim 4 further comprising increasing the regular time interval at which the predictive failure analysis is performed if the measured operating parameter falls below a third threshold.

8. A method of operating a disk drive, comprising:
   detecting a trigger event with respect to a particular sector of the disk drive during non-idle operation of the disk drive; and
   in response to the detected trigger event, performing a flying height measurement with respect to the particular sector.

9. The method of claim 8, further comprising relocating data from a cylinder that includes the particular sector to another portion of the disk drive based on a result of the flying height measurement.

10. The method of claim 8, wherein the step of performing a flying height measurement includes measuring flying height with respect to the particular sector and with respect to one or more sectors adjacent to the particular sector.

11. The method of claim 10, wherein the flying height measurement is performed a plurality of times with respect to each of the particular sector and the one or more adjacent sectors, the measurements for the one or more adjacent sectors are averaged, the measurements for the particular sector are averaged, and the averaged measurements are compared.

12. The method of claim 11, wherein the flying height measurement is performed at least 10 times with respect to the particular sector and the one or more adjacent sectors.

13. The method of claim 10, wherein the flying height is measured with respect to at least two sectors located immediately before the particular sector and with respect to at least two sectors located immediately after the particular sector.

14. A method of operating a disk drive, comprising:
   detecting a defect in a first cylinder of the disk drive; and
   in response to the detected defect, relocating to another portion of the disk drive data stored in a plurality of adjoining cylinders including the first cylinder.

15. A disk drive, comprising:
   at least one disk-shaped data storage medium;
   at least one head adapted to read data from and write data to the storage medium; and
   a controller adapted to control movement of the at least one head, the controller operative to:
      detect a trigger event during non-idle operation of the disk drive; and
      respond to the detected trigger event by adjusting a frequency of performing a predictive failure analysis with respect to the disk drive.

16. A disk drive, comprising:
   at least one disk-shaped data storage medium;
   at least one head adapted to read data from and write data to the storage medium; and
   a controller adapted to control movement of the at least one head, the controller operative to:
      perform a predictive failure analysis with respect to the disk drive at a regular time interval;
      detect a trigger event during non-idle operation of the disk drive; and
      respond to the detected trigger event by reducing the regular time interval at which the predictive failure analysis is performed.

17. The disk drive of claim 16, wherein the regular time interval is four hours before being reduced and is two hours after being reduced.

18. A disk drive, comprising:
   at least one disk-shaped data storage medium;
   at least one head adapted to read data from and write data to the storage medium; and
   a controller adapted to control movement of the at least one head, the controller operative to:
      perform a predictive failure analysis with respect to the disk drive at a regular time interval, the predictive failure analysis including measuring an operating parameter of the disk drive and comparing the measured operating parameter against a first threshold and a second threshold;
      reduce the regular time interval at which the predictive failure analysis is performed if the measured operating parameter exceeds the first threshold; and
      indicate a failure if the measured operating parameter exceeds the second threshold.

19. The disk drive of claim 18, wherein the measured operating parameter is a change in flying height.

20. The disk drive of claim 19, wherein the first threshold is 80% of the second threshold.

21. A disk drive, comprising:
   at least one disk-shaped data storage medium;
   at least one head adapted to read date from and write data to the storage medium; and a controller adapted to control movement of the at least one head, the controller operative to:
  detect a trigger event with respect to a particular sector of the disk drive during non-idle operation of the disk drive; and
  in response to the detected trigger event, perform a flying height measurement with respect to the particular sector.

22. The disk drive of claim 21, wherein the controller is further operative to relocate data from a cylinder that includes the particular sector to another portion of the disk drive based on a result of the flying height measurement.

23. The disk drive of claim 21, wherein the flying height measurement includes measuring flying height with respect to the particular sector and with respect to one or more sectors adjacent to the particular sector.

24. The disk drive of claim 23, wherein the flying height measurement is performed a plurality of times with respect to each of the particular sector and the one or more adjacent sectors, the measurements for the one or more adjacent sectors are averaged, the measurements for the particular sector are averaged, and the averaged measurements are compared.

25. The disk drive of claim 24, wherein the flying height measurement is performed at least 10 times with respect to the particular sector and the one or more adjacent sectors.

26. The disk drive of claim 23, wherein the flying height is measured with respect to at least two sectors located immediately before the particular sector and with respect to at least two sectors located immediately after the particular sector.

27. A disk drive, comprising:
  at least one disk-shaped data storage medium;
  at least one head adapted to read data from and write data to the storage medium; and
  a controller adapted to control movement of the at least one head, the controller operative to:
    detect a defect in a first cylinder of the disk drive; and
    in response to the detected defect, relocate to another portion of the disk drive data stored in a plurality of adjoining cylinders including the first cylinder.

28. A computer program product for operating a disk drive, comprising:
  a medium readable by a computer, the computer readable medium having computer program code adapted to:
    detect a trigger event during non-idle operation of the disk drive; and
    respond to the detected trigger event by adjusting a frequency of performing a predictive failure analysis with respect to the disk drive.

29. A computer program product for operating a disk drive, comprising:
  a medium readable by a computer, the computer readable medium having computer program code adapted to:
    perform a predictive failure analysis with respect to the disk drive at a regular time interval;
    detect a trigger event during non-idle operation of the disk drive; and
    respond to the detected trigger event by reducing the regular time interval at which the predictive failure analysis is performed.

30. A computer program product for operating a disk drive, comprising:
  a medium readable by a computer, the computer readable medium having computer program code adapted to:
    perform a predictive failure analysis with respect to the disk drive at a regular time interval, the predictive failure analysis including measuring an operating parameter of the disk drive and comparing the measured operating parameter against a first threshold and a second threshold;
    reduce the regular time interval at which the predictive failure analysis is performed if the measured operating parameter exceeds the first threshold; and
    indicate a failure if the measured operating parameter exceeds the second threshold.

31. A computer program product for operating a disk drive, comprising:
  a medium readable by a computer, the computer readable medium having computer program code adapted to:
    detect a trigger event with respect to a particular sector of the disk drive during non-idle operation of the disk drive; and
    in response to the detected trigger event, perform a flying height measurement with respect to the particular sector.

32. A computer program product for operating a disk drive, comprising:
  a medium readable by a computer, the computer readable medium having computer program code adapted to:
    detect a defect in a first cylinder of the disk drive; and
    in response to the detected defect, relocate to another portion of the disk drive data stored in a plurality of adjoining cylinders including the first cylinder.

33. A method of operating a disk drive, comprising:
  detecting a trigger event during non-idle operation of the disk drive; and
  responding to the detected trigger event by performing a predictive failure analysis with respect to the disk drive;
  wherein the trigger event is selected from the group consisting of an increase in a media error rate, an increase in a servo error rate, a load/unload event, a start-stop event, a temperature that is outside of a predetermined temperature range, a humidity that is outside of a predetermined humidity range, a change in altitude, a predetermined period of inactivity, an acceleration that is in excess of a predetermined acceleration limit, and a change in the disk run out.

34. A method of operating a disk drive, comprising:
  performing a predictive failure analysis with respect to the disk drive at a regular time interval, the predictive failure analysis including measuring an operating parameter of the disk drive and comparing the measured operating parameter against a first threshold and a second threshold;
  reducing the regular time interval at which the predictive failure analysis is performed if the measured operating parameter exceeds the first threshold; and
  indicating a failure if the measured operating parameter exceeds the second threshold;
  wherein the measured operating parameter is a change in flying height; and
  wherein the first threshold is 80% of the second threshold.

35. A method of operating a disk drive, comprising:
  detecting a trigger event with respect to a particular sector of the disk drive during non-idle operation of the disk drive; and
  in response to the detected trigger event, performing a flying height measurement with respect to the particular sector;

wherein the step of performing a flying height measurement includes measuring flying height with respect to the particular sector and with respect to one or more sectors adjacent to the particular sector;

wherein the flying height measurement is performed a plurality of times with respect to each of the particular sector and the one or more adjacent sectors, the measurements for the one or more adjacent sectors are averaged, the measurements for the particular sector are averaged, and the averaged measurements are compared; and wherein the flying height measurement is performed at least 10 times with respect to the particular sector and the one or more adjacent sectors.

36. A disk drive, comprising:

at least one disk-shaped data storage medium;

at least one head adapted to read data from and write data to the storage medium; and a controller adapted to control movement of the at least one head, the controller operative to:

perform a predictive failure analysis with respect to the disk drive at a regular time interval, the predictive failure analysis including measuring an operating parameter of the disk drive and comparing the measured operating parameter against a first threshold and a second threshold;

reduce the regular time interval at which the predictive failure analysis is performed if the measured operating parameter exceeds the first threshold; and indicate a failure if the measured operating parameter exceeds the second threshold;

wherein the measured operating parameter is a change in flying height; and wherein the first threshold is 80% of the second threshold.

37. A disk drive, comprising:

at least one disk-shaped data storage medium;

at least one head adapted to read data from and write data to the storage medium; and a controller adapted to control movement of the at least one head, the controller operative to:

detect a trigger event with respect to a particular sector of the disk drive during non-idle operation of the disk drive; and in response to the detected trigger event, perform a flying height measurement with respect to the particular sector;

wherein the flying height measurement includes measuring flying height with respect to the particular sector and with respect to one or more sectors adjacent to the particular sector;

wherein the flying height measurement is performed a plurality of times with respect to each of the particular sector and the one or more adjacent sectors, the measurements for the one or more adjacent sectors are averaged, the measurements for the particular sector are averaged, and the averaged measurements are compared; and wherein the flying height measurement is performed at least 10 times with respect to the particular sector and the one or more adjacent sectors.

* * * * *